United States Patent [19]
Allgulin

[11] 4,233,274
[45] Nov. 11, 1980

[54] METHOD OF EXTRACTING AND RECOVERING MERCURY FROM GASES

[75] Inventor: Torkel Allgulin, Helsingborg, Sweden

[73] Assignee: Boliden Aktiebolag, Stockholm, Sweden

[21] Appl. No.: 8,235

[22] Filed: Feb. 1, 1979

Related U.S. Application Data

[63] Continuation of Ser. No. 911,817, Jun. 2, 1978, abandoned, which is a continuation of Ser. No. 816,131, Jul. 15, 1977, abandoned, which is a continuation of Ser. No. 723,473, Sep. 14, 1976, abandoned.

[30] Foreign Application Priority Data

Sep. 16, 1975 [SE] Sweden ............................... 7510341

[51] Int. Cl.² ............................................. B01D 53/34
[52] U.S. Cl. ........................................ 423/210; 55/72
[58] Field of Search ................. 423/210; 55/72; 210/210 R, 210 M

[56] References Cited

U.S. PATENT DOCUMENTS

| | | | |
|---|---|---|---|
| 3,725,530 | 4/1973 | Kawase et al. | 423/210 |
| 3,764,496 | 10/1973 | Hultman et al. | 423/210 X |
| 3,838,190 | 9/1974 | Birke et al. | 423/210 |
| 3,849,537 | 11/1974 | Allgulin | 423/210 |
| 3,974,254 | 8/1976 | Herrera et al. | 423/210 |

*Primary Examiner*—Earl C. Thomas
*Attorney, Agent, or Firm*—Stevens, Davis, Miller & Mosher

[57] ABSTRACT

A method of extraction of mercury from gases containing gaseous elementary mercury comprising treating said gases in a closed circuit with an aqueous solution containing 0.1–300 mmol/l mecury(II)-ions and at least double that content of ions with the ability to form soluble complexes with mercury(II)-ions whereafter mercury absorbed in solution is recovered and the solution recirculated.

12 Claims, 1 Drawing Figure

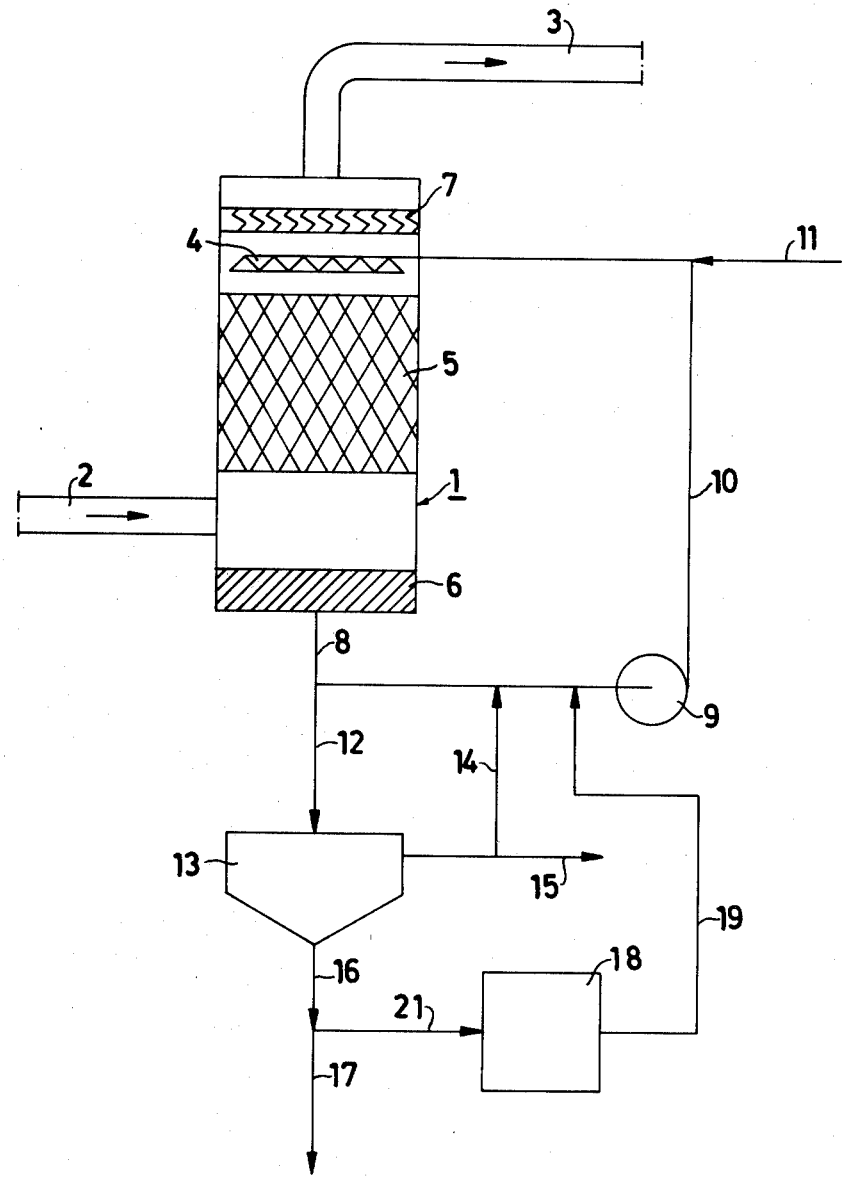

METHOD OF EXTRACTING AND RECOVERING MERCURY FROM GASES

This is a continuation of application Ser. No. 911,817 filed June 2, 1978, now abandoned, which in turn is a continuation appln. of Ser. No. 816,131 filed July 15, 1977, now abandoned, which in turn is a continuation appln. of Ser. No. 723,473 filed Sept. 14, 1976, now abandoned.

The present invention refers to a method of extracting and recovering mercury from gases containing gaseous elementary mercury, Hg°. The method is particularly suitable for recovering mercury from gases produced in the roasting of sulphidic ores containing mercury. The same method can, however, also be used advantageously for recovering mercury from other gases.

It has been demonstrated, especially in recent years, that the presence of mercury in industrial processes can lead to immission risks through the release of gases and other waste products and through mercury contamination of the manufactured product. The latter is of particularly great significance when it concerns such products as fertilizers and animal feed, the production of which requires very large quantities of sulphuric acid often prepared from roasting gases and where the necessity of a low mercury content in the acid has become more important. On the other hand, however, it should not be forgotten that mercury is also a valuable industrial product with a highly diversified range of uses.

The recovery of elementary mercury by means of absorption and oxidation in solutions is already known. For example, the treatment of gases containing mercury with hypochlorite solution having a pH-value of 4.5–9.0 can be mentioned. See, for example, U.S. Pat. No. 3,476,552. It can also be mentioned that potassium permanganate solutions have been used to absorb elementary mercury, especially for analytical purposes. See for example Amer. Ind. Hyg. Assoc. J. 17, 418-20 (1956).

There are also several methods for the adsorption of elementary mercury in gases on solid material such as carbon and other carriers which have, for example, been impregnated with sulphides (see, for example, German Pat. No. 1,075,953 or the U.S. Pat. No. 3,194,629).

Gases containing elementary mercury are obtained—apart from the roasting of minerals containing mercury—also from inter alia chlorine alkali processes and from the regeneration of certain catalysts containing mercury which are used in organic synthesis.

In the roasting of sulphidic minerals containing mercury compounds a large proportion of the mercury compounds present in the roasting gases is separated in particle form by means of conventional gas purification methods. However, it is very often impossible to control roasting and gas cleaning processes to get a dust-free gas with a sufficiently low content of elementary gaseous mercury which could be directly utilized in other processes or delivered to a recipient. There is normally no difficulty in expelling mercury compounds from the roasting material and the mercury present in the material will, therefore, normally to a great extent be included in the roaster gas as mercury compounds and elementary mercury in the form of particles or vapor. In practice, particle mercury can be removed by means of conventional dust separation whilst the mercury vapor continues with the gas through the whole sulphuric acid process and into the finished sulphuric acid product. This leads thus both to the contamination of the acid and the loss of valuable mercury.

The roasting of sulphidic ores produces a roaster gas containing sulphur dioxide often to the extent of 4-16%, which, depending on the composition of the ore, contains varying quantities of volatile compounds. Compounds commonly found in this connection are, for example, those of arsenic, lead and antimony as well as mercury either free or chemically combined. The roaster gas containing sulphur dioxide obtained is normally used in the production of sulphur trioxide, sulphuric acid and/or liquid sulphur dioxide. This process requires an extremely pure raw material in the form of sulphur dioxide gas since other compounds in the gas can, in certain cases, have an unfavourable effect on the reactions and lead to contamination of the finished product and the final exhaust gases.

The roaster gases formed in the roasting of sulphidic material are led from the furnace to a cyclone, for example, where the gases are cleaned by removing the dust particles entrained in the gas in a conventional way. Then the gases are cooled and dry purified in, for instance, an electric precipitator. Final purification of the gas is carried out, for example, by means of washing in a scrubber followed by a wet electric precipitator. The recovery of an elementary gaseous mercury to the extent required is not, however, possible with the above methods.

It has now been shown that gaseous elementary mercury included in the gases can be recovered from these gases by a method having excellent results and characterized by (a) treating the gas containing mercury with an aqueous solution in a closed circuit, the solution containing 0.1–300 mmol/1 mercury(II)-ions and at least double that content of ions with the ability to form soluble complexes with mercury(II)-ions, whereby the mercury in the gas is absorbed in the solution.

(b) freeing the solution obtained of the mercury, absorbed by leading off at least some of the solution and removing precipitated mercury compounds and/or precipitating and removing mercury compounds, and (c) returning solution after mercury precipitation, complex-forming ions and mercury(II)-ions to the closed circuit in a quantity sufficient to maintain said concentrations in the aqueous solution.

During the treatment, the temperature of the liquid ought to be kept between 0° and 70° C. A temperature below approximately 40° C. is particularly advantageous. The method is thus characterized by the fact that the solution contains an oxidizing agent for elementary mercury and mercury(II) in the form of $(Hg^{2+})$-X-complex, where X indicates a halogenide or pseudo-halogenide such as chlorine, bromine, iodine, rhodanide-ion or cyanide-ion. It has been demonstrated that mercury(II)-ions in the presence of an excess of $X^{31}$ is particularly selective and active in the absorption and oxidation of elementary mercury. In certain cases other oxidizing agents such as sulphite-ions and ions in equilibrium with them in an aqueous solution can also be used to advantage. Other examples of oxidizing agents are hydrogen peroxide, oxygen, ozone, peroxodisulphuric acid, ammonium-peroxodisulphate and chlorine.

The presence of halogenide or pseudo-halogenide-ions, $X^-$, means that a reduction, by itself possible, of mercury(II)-ions with the reducing gas components is completely or partially prevented by the fact that mercury(II)-ions form a stable complex, $HgX_n{}^{2-n}$, where n symbolyzes an integer between 0 and 4 but where most of the mercury(II)-ions exist in complex form where n symbolyzes 2, 3 or 4. Halogenide-ions also precipitate mercury(I)-ions in an easily recoverable form. If pseudo-halogenides are used as complex former other precipitating reagents such as sulphide-ions or sulphur compounds forming sulphide-ions can be added.

As halogenides can also be used as precipitating ions, it is possible to use pseudo-halogenides together with halogenides in different combinations. The different vapour pressure of the mercury(II)-complexes influences the mercury content in the outgoing washed gas and thus the result of the washing operation at the working temperature. The halogenides and pseudohalogenides can thus be used in combination in a single step or in separate washing circuits, where in a first circuit the gas is washed with e.g. chloride complexes and in a second circuit with e.g. rhodanide complexes together with precipitating ions, since the mercury vapour pressure is somewhat lower over rhodanide complexes which permits a higher operation temperature without any deterioration of the mercury yield.

The pseudohalogenides are useful at somewhat increased washing temperatures then halogenides and this is of importance since the reactivity of the pseudohalogenides is lower due to kinetic reasons. Thus, when sufficient cooling capacity is available, halogenides are favourable for the process according to the invention due to their higher reactivity and lower cost. In certain cases, however, when gas cooling capacities are limited, the use of pseudohalogenides may be favourable, although certain problems can occur due to the fact that toxic compounds can be formed in the process, and therefore high security requirements for the apparatus arise.

The mercury transformed in the washing step to $Hg_2X_2$ has, as such, dissolved or solid in the washing water such low vapor pressure that the outgoing roaster gas is practically mercury free.

In order to achieve the favourable results which the present invention affords it is necessary to maintin a certain quantity of mercury(II)-ions in the washing liquid. This can be done by adding mercury(II)-ions and is done most suitable in continuous operation by oxidizing precipitated $Hg_2X_2$ to soluble salt in which mercury(II)-ions are present and returned to the washing liquid. This can be achieved by the addition of an oxidizing agent such as oxygen or chlorine gas.

If mercury(II)-ions are added in the form of mercury(II) chloride an undesirable excess of chloride-ions can in certain cases be obtained in the steady state because the following reaction cannot be entirely avoided:

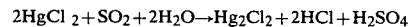

$$2HgCl_2 + SO_2 + 2H_2O \rightarrow Hg_2Cl_2 + 2HCl + H_2SO_4$$

This excess can, however, easily be regulated by the regular removal of liquid from the closed circuit. The liquid removed can be freed of mercury by treating with a reducing agent, whereby the remaining quantity of divalent mercury can be transformed to the univalent mercury(I)chloride compound which dissolves with difficulty. Zinc, aluminium, iron, silicon, sulphur dioxide or nascent hydrogen gas can, for example, be used as reducing agent. After removal of the precipitated mercury(I)chloride the residual solution can be discarded.

In other cases, especially when working at a low temperature, a deficiency of chloride-ions can be obtained caused inter alia by the loss of chloride in sludge separation. This can be counteracted by the introduction in suitable quantities of, for example, seawater to the aqueous solution in the closed circuit. The recovery of elementary mercury from gases described here can suitably take place in a conventional absorption tower but where the quantity of particle mercury in the gas is great it is better to use a system consisting of a Venturi scrubber followed by a packed column and a drop separator. The process solution circulates in what is basically a closed system from which a small quantity is more or less continuously removed after purification for discharge. The entire circulating process solution or part thereof is purified with respect to precipitated mercury compounds by means of sedimentation, centrifugal separation or filtration. Separated precipitated $Hg_2X_2$ is thereafter oxidized so that a sufficient quantity of mercury(II)-ions is obtained for recirculation in the washing system.

The oxidation of $Hg_2X_2$ to mercury(II)-ions is carried out in a manner known per se. For example, a corresponding halogen can be used as oxidizing agent but also hydrogen peroxide, oxygen gas, ozone, peroxodisulphuric acid and ammonium peroxodisulphate can be used. Sludge separated from the washing liquid may after the removal of residual sulphur dioxide, be brought into contact with for example $Cl_2$ at a temperature of 20°–60° C. The reaction is rapid and more or less complete with respect to $Cl_2$. Solid $Hg_2Cl_2$ is thereby transformed to an aqueous solution of $HgCl_2$ in accordance with the formula $Hg_2Cl_2 + Cl_2 \rightarrow °HgCl_2$. At a somewhat higher temperature the solubility of $Hg_2Cl_2$ is approximately 100 g/l. Where it is of particular importance that the gas leaving the process contains a very low quantity of mercury it has also been shown that it is favourable to arrange the treatment in several steps in which the gas is treated with aqueous solutions containing decreasing quantities of mercury(II)-ions at every consecutive step. In this way, the content can be up to 3000 times higher in the first circuit than in the last. In this it is best to keep the content in the first circuit between 10 and 300 mmol/l, preferably between 50 and 200 mmol/l while in the last circuit the mercury(II)-content can be kept at the lowest 0.1 mmol/l. This gives the surprising advantage in that the recovery of mercury is practically complete. This is accounted for both by the fact that drops of solution with relatively high mercury content entrained in the gas is avoided and by the fact that the vapour pressure of aboveall mercury(II)-chloride from a relative point of view increasingly affects the content in the outgoing gas the lower the total mercury content of the gas gets. If, however, the content of mercury(II)-ion in the process solution is too low the mercury will no longer be able to be absorbed. Where treatment of the gas takes place in two steps it is best to keep the mercury(II)-content in the second treatment step between 0.1 and 100 mmol/l but preferably between 10 and 50 mmol/l. In the first step it is best to use a Venturi scrubber and in the second step a conventional absorption tower.

To illustrate the invention in more detail reference is now made to the FIGURE which shows a plant for the removal and recovery of mercury from roaster gases.

The FIGURE shows an absorption tower (1) equipped with an inlet (2) for gas containing mercury and an outlet (3) for treated gas. Solution is injected into the absorption tower via nozzles (4) over packings (5) after which the solution is collected at the bottom (6) of the tower. To prevent solution being entrained in the gas the tower is equipped with a drop separator (7). From the tower the solution is led via a conduit (8) to a pump (9) for recirculation to the tower via conduit (10). Via a conduit (11) fresh solution and water can be fed into the system. Some of the solution from conduit (8) is led off via conduit (12) and is transferred to a sludge separator (13) which can consist of a sedimentation device, a filter or a centrifugal separator. After removing the sludge the solution is returned via conduit (14) or removed via conduit (15) and completely purified by means of precipitation. From the sludge separator (13) the separated sludge is led through conduits (16, 17) to a sludge silo or to a regenerating device (18) via conduits (16, 21). From the regenerating device (18) regenerated solution is led via conduit (19) to the pump (9). In the regeneration step any mercury present is then oxidized to the desired content of mercury(II)-ions and returned to the circuit. When it is desired to remove mercury entirely from the gas an analogous absorption step can be arranged in conduit (3) with a circuit containing a process solution with a considerably lower content of mercury(II)-ions.

EXAMPLE 1

In a device for recovering mercury from roaster gases 30 000 Nm$^3$/h were treated. The roaster gas contains 6 percent by volume sulphur dioxide and 4 mg Hg°/Nm$^3$ gas. The gas was introduced to the absorption tower at a temperature of 32° C. and treated with an aqueous solution containing 3 g Hg$^{2+}$/l and 4 g Cl$^-$/l. After the treatment the gas contained 0.02 mg Hg°/Nm$^3$ gas. The process solution was led into a circuit and at equilibrium 30% of the circulating quantity was continuously removed by means of a side stream. Precipitated Hg$_2$Cl$_2$ from this was allowed to settle in a sludge separating device. The mercury(II)-ions consumed were compensated for by returning process solution in a concentrated form containing 30 g Hg$^{2+}$/l and 40 g Cl$^-$/l after regenerating a part of the separated mercury (I) chloride sludge. The rest of the separated sludge was mixed with separated particle mercury in a gas purification device located before the treatment tower and led to a plant for the recovery of metallic mercury.

EXAMPLE 2

After substituting the chloride ions as complex former in the solution according to Example 1 for a corresponding equimolar amount of rhodanide ions the same low mercury content in the treated gas was possible to achieve but first after reducing the gas velocity and thus the capacity to about half of what is indicated in Example 1.

I claim:

1. A method for extraction and recovery of mercury from gases containing gaseous elementary mercury, which comprises
    (a) treating the gas containing mercury with an aqueous solution in a closed circuit, the solution containing 0.1–300 mmol/l mercury(II)-ions and at least double that content of ion or ions selected from the group consisting of chlorine, bromine, iodine, cyanide and rhodanide ions with the ability to form soluble complexes with mercury (II)-ions, whereby the mercury in the gas is absorbed in the solution,
    (b) freeing the solution obtained of the mercury absorbed by leading off at least some of the solution, treating the same with a reducing agent and separating precipitated mercury compounds and
    (c) after mercury precipitation returning the solution, complex forming ions and mercury (II)-ions to the closed circuit in a quantity sufficient to maintain said concentration in the aqueous solution.

2. A method in accordance with claim 1, wherein an oxidizing agent is added to the aqueous solution.

3. A method in accordance with claim 2, wherein hydrogen peroxide is used as the oxidizing agent.

4. A method in accordance with claim 2, wherein ozone is used as the oxidizing agent.

5. A method in accordance with claim 2, wherein ammonium peroxodisulphate is used as the oxidizing agent.

6. A method in accordance with claim 2, wherein peroxodisulphuric acid is used as the oxidizing agent.

7. A method in accordance with claim 2, wherein chlorine is used as the oxidizing agent.

8. A method in accordance with claim 2, wherein oxygen is used as the oxidizing agent.

9. A method in accordance with claim 1, comprising treating the gas in several steps so that the aqueous solution in each step has a lower content of mercury(II)-ions in the circuit than in every preceding step.

10. A method in accordance with claim 1, wherein the content of chloride ions in the aqueous solution is maintained by the addition of sea water.

11. A method in accordance with claim 1 wherein chlorine, bromine or iodine ions are used as complex-forming ions, comprising treating the solution being led off with a reducing agent selected from the group consisting of zinc, aluminum, iron, silicon, sulphur dioxide and nascent hydrogen.

12. A method in accordance with claim 1, wherein cyanide or rhodanide ions are used as complex-forming ions, comprising treating the solution being led off with a reducing agent selected from the group consisting of sulphide ions and sulphur compounds forming sulphide ions.

* * * * *